3,002,000
1,2-ALKYLENE-DIHYDROPYRIMIDONE-6, AND 1,2-ALKYLENE-IMIDAZOLINONES-(5)

Ernst Tietze and Siegfried Petersen, Leverkusen-Bayerwerk, Germany, assignors to Farbenfabriken Bayer Aktiengesellschaft, Leverkusen, Germany, a corporation of Germany
No Drawing. Filed Oct. 5, 1959, Ser. No. 844,202
Claims priority, application Germany Nov. 8, 1958
4 Claims. (Cl. 260—251)

The present invention relates to novel heterocyclic compounds with at least 2 nitrogen atoms useful as anesthetics, hypnotics, sedatives, circulatory agents and other medicinal purposes.

The new compounds of this invention are obtained from the products of copending application Serial No. 844,203, filed October 5, 1959, now abandoned, by liberation of 1 mol of water from and ring closure of those condensates of α- and β-amino-carboxylic acids containing a carboxyl group, which may be in the form of a functional derivative, and an aliphatically linked primary amino group with a cyclic lactim ether, thioether or ester. The condensation is carried out by heating, preferably in a high-boiling inert medium having a boiling point in the range of about 130 to 200° C.

The starting materials are produced as described in the aforesaid copending application. The reactants are heated together under vacuum, preferably under high vacuum, to the temperature at which ring closure with liberation of water begins or they are heated in a high boiling inert solvent such as xylene, chlorobenzene, o-dichlorobenzene, trichlorobenzene, decahydronaphthalene, naphthalene or nitrobenzene, the liberated water being azeotropically removed with the distilling solvent. Further purification of the new heterocycles is best effected by vacuum distillation. They are colorless oils which crystallize at low temperature and dissolve very readily in water to give solutions that are nearly neutral. Stable, high-fusing, water-soluble salts are formed with dilute mineral acids such as hydrochloric acid.

The invention is illustrated by the following non-limitative examples:

EXAMPLE I 92 parts by weight of the condensate of β-aminopropionic acid and caprolactim methyl ether of the formula:

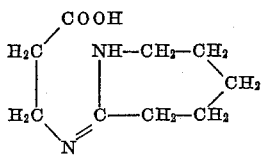

with a decomposition point of 202–204° C. are heated to the boil with stirring in 500 parts by weight of o-dichlorobenzene under a descending condenser until no more water comes over with the distilling o-dichlorobenzene. This occurs after 2 hours, when about 300 parts by weight of o-dichlorobenzene have passed over. The solution is filtered to remove a certain amount of resin and is then clear. It is freed from remaining o-dichlorobenzene on a water bath under vacuum, and the oleaginous residue is subjected to vacuum fractionation. At 14 mm. pressure, 64 parts by weight (77% of the theoretical yield) of a colorless oil boil between 147 and 149° C. The oil completely solidifies to a crystalline mass, which melts at 34–35° C. The compound has the structure:

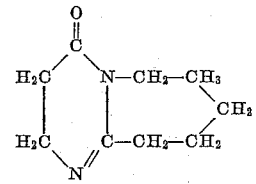

is hygroscopic and is extremely readily soluble in water. The aqueous solution has a pH of 8.

The same compound is obtained in a similar yield when the aforementioned starting product is distilled "dry" under high vacuum at a bath temperature of 210–240° C. during 20 minutes, and the crude product resulting is rectified under a vacuum of 14 mm. With alcoholic hydrochloric acid a well-crystallized hydrochloride of m.pt. 232–234° C. is obtained in alcohol solution.

EXAMPLE II 42.4 parts by weight of a carboxylic acid of the following structure:

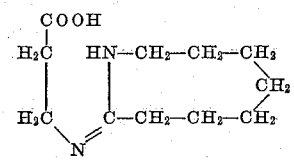

having a decomposition point of 171–173° C., obtained by condensation of β-aminopropionic acid with capryllactam methyl ether, are heated with stirring in 250 parts by weight of o-dichloro-benzene until no more water comes over with the distilling o-dichlorobenzene. On cooling of the o-dichlorobenzene solution some resin precipitates, from which the solution is freed by decantation. Following distillation of the o-dichlorobenzene on a water bath under 14 mm. pressure, the remaining oil is distilled under high vacuum. At 0.1 mm. a compound of the structure:

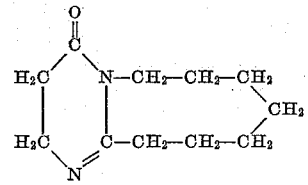

boils between 102 and 104° C. The colorless oil soon crystallizes, the crystals melting at 58–60° C. The compound is very readily water-soluble. The solution has a pH of 7.5. A readily soluble, well-crystallizing salt is formed with dilute hydrochloric acid.

EXAMPLE III 102 parts by weight of the condensate of aminoacetic acid and caprolactim methyl ether of the formula:

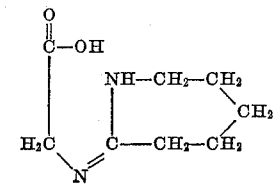

which decomposes at 181–182° C., are heated to the boil in 800 parts by weight of o-dichlorobenzene until no more water comes over with the distilling o-dichlorobenzene. This requires about 40–50 minutes. The cooled solution is decanted from some precipitated resin. The o-dichlorobenzene is removed under vacuum on a water bath, and the residue is distilled from an oil bath. The new compound boils under 14 mm. pressure between 145 and 147° C. 63 parts by weight (or 70% of theory) of a colorless oil with the following structure are obtained:

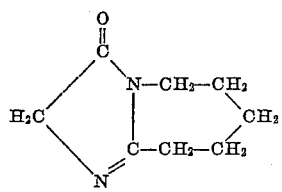

which gradually crystallizes. The crystals melt at 33° C.

The compound is readily soluble in water, the aqueous solution having a pH of 6.5. A readily water-soluble, well-crystallizing hydrochloride decomposing at 240–242° C. is obtained with dilute HCl.

When trichlorobenzene is employed instead of o-dichlorobenzene under otherwise unchanged conditions, water is liberated much more rapidly but the yield is lower because of increased resin formation.

Even without heating liquid, the carboxylic acid gives off water when heated under vacuum to about 200° C. The cyclic compound distills as a colorless oil between 140 and 165° C. and requires a single rectification for complete purification.

The invention thus comprises a heterocyclic condensation product having 2 or more nitrogen atoms and obtained from the water-liberating, ring closing reaction of an aminocarboxylic acid having a carboxyl group and an aliphatically linked primary amino group with a cyclic lactim ether, thioether or ester. The new products may for the most part be represented by the formula:

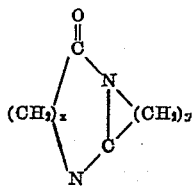

wherein $x$ is a small integer, usually 1, 2, 3, 4 or 5, or a phenyl group, the $CH_2$ chain being branched or unbranched, and $y$ is a small integer usually 3, 4, 5, 6 or 7. When $x$ is phenyl, $(CH_2)_x$ is benzyl.

What is claimed is:

1. The compound:

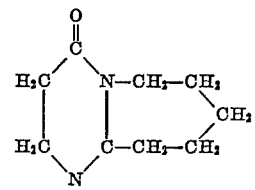

2. The compound:

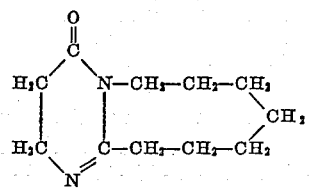

3. The compound:

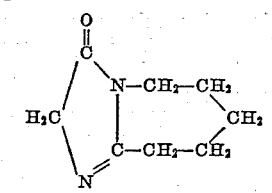

4. A compound selected from the group consisting of

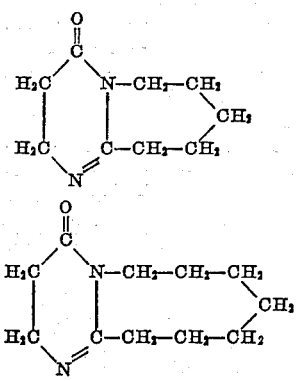

and

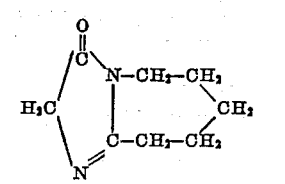

No references cited.